Aug. 28, 1928.
E. BLANK
1,682,657
BRUSH LIKE IMPLEMENT FOR PAINTING WITH LIQUID SUBSTANCES
Filed Aug. 24, 1925
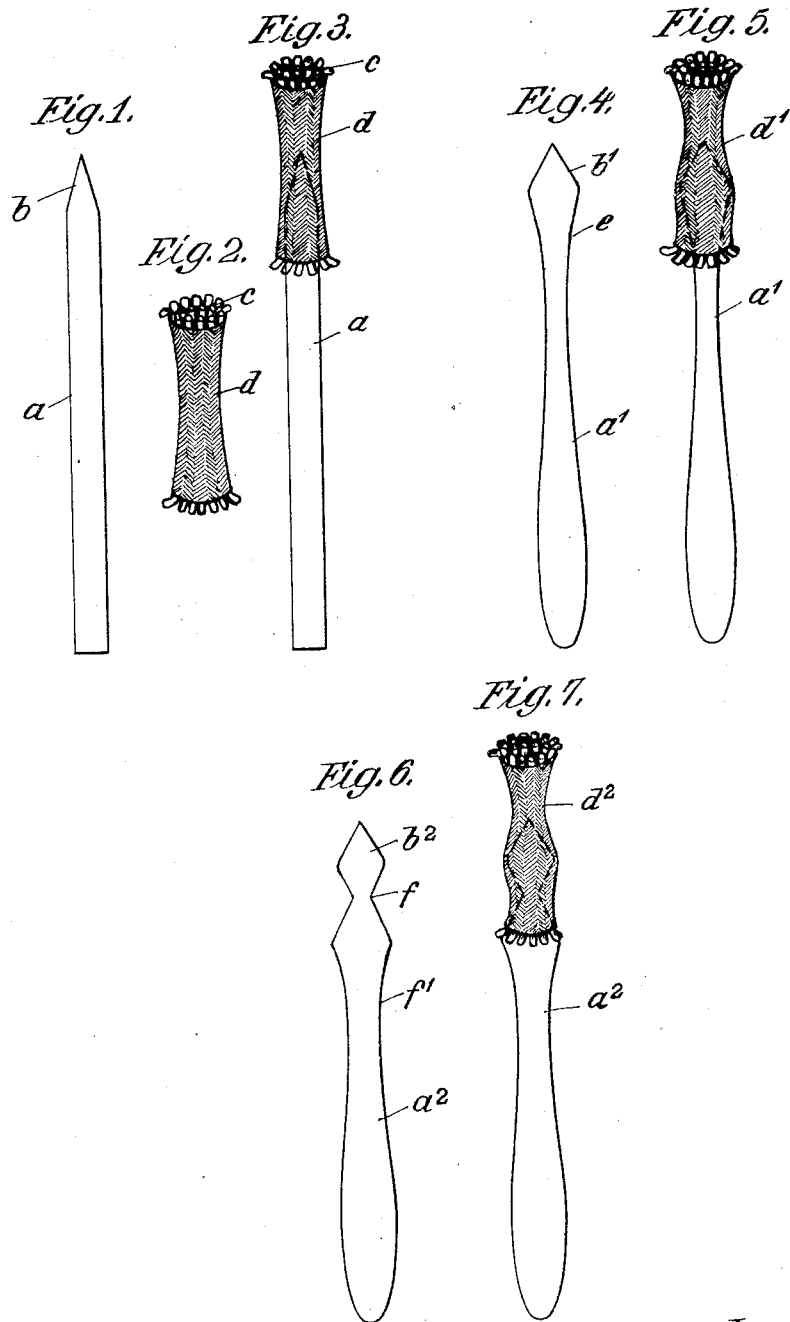
Inventor:
Ernst Blank
per
Attorney.

Patented Aug. 28, 1928.

1,682,657

UNITED STATES PATENT OFFICE.

ERNST BLANK, OF EITORF-ON-THE-SIEG, GERMANY.

BRUSHLIKE IMPLEMENT FOR PAINTING WITH LIQUID SUBSTANCES.

Application filed August 24, 1925, Serial No. 52,119, and in Germany December 15, 1924.

This invention relates to an implement for painting liquid substances, specially medicaments, on the skin, the implement serving as substitutes for a brush. The implement consists, according to the invention, of a pointed rod, and of a brush of cotton wool or a piece of wick made from cotton wool and spun round with an elastic cover and designed to be thrown away after it has been used once.

The implement presents considerable advantages from the hygienic point of view. As brushes are rather expensive they cannot be destroyed after having been used once and the washing of a brush after use requires much time and is not always possible. When one and the same brush is used for treating several diseased persons contagious diseases might be transferred from one person to the other. It is further not hygienic to dip a brush into the liquid medicament and when the liquid medicament is poured on the brush much substance gets lost. All these and other inconveniences are avoided by the invention.

Three embodiments of the invention are shown, by way of example, in the accompanying drawing in which Figs. 1 and 2 show the two elements separately of which the implement is composed.

Fig. 3 shows the implement ready for use.

Fig. 4 shows a modified form of the rod.

Fig. 5 shows this rod with the bunch of cotton wool.

Fig. 6 shows a third form of construction of the rod and

Fig. 7 shows the rod with the bunch of cotton wool ready for use.

A rod $a$ of wood, celluloid, bone or other convenient material, about of the length of a finger, flat, round or cornered, has a point $b$ at least at one end. If the rod has only one point $b$ its other end is shaped to serve as handle. A bundle of wicks $c$ made from wadding or cotton wool are spun over with an elastic cover $d$ made from fabric. Of the long wick which is thus produced short pieces are cut so that when the implement has to be used one of such pieces is put on the pointed end $b$ of rod $a$, an implement being thus formed which is similar to a brush. The liquid to be painted on is poured on the bunch of cotton wool $c$ which absorbs the liquid so that nothing is lost. When the painting is finished the bunch of cotton wicks is stripped off the rod $a$ and thrown away.

Owing to the tubular elastic envelope the bunch of wicks of cotton wool is securely held on the rod $a$ which must be of a thickness or width which approximately corresponds to the diameter of the bunch.

As shown in Figs. 4 and 5 the point $b'$ of the rod $a'$ may be wedge-shaped or spear-shaped, a narrowed neck portion $e$ being arranged behind the point. When the bunch of cotton wool wicks $d'$ is placed on the point $b'$ of rod $a'$ it expands around the broad portion of the point and retracts behind this broad portion on the narrowed neck, so that the bunch $d'$ is securely held on the rod as shown in Fig. 5.

As shown in Figs. 6 and 7 two or more triangular incisions $f, f'$ are arranged behind the pointed end $b^2$ of rod $a^2$, so that the laterally projecting points get larger from the front end to the handle. The indentations may be rounded instead of sharp edged. The first indentation $f$ from the front is smallest and the front point $b^2$ is the thinnest. This form of construction presents the advantage that the wick fits well even if it should be too wide for the front point $b^2$. In this case it will be held securely by the second or third point. If the wick should slip down on the rod too far the front point $b^2$ could be broken off.

I claim:—

A dabbing-instrument comprising in combination a bundle of cotton-wool wicks, a tubular cover of extensible fabric enclosing said bundle of wicks so that these wicks project at both ends of said cover, and a rod having a point and incisions behind said point adapted to be inserted into the bundle of wicks to spread the same and to expand said cover of fabric.

In testimony whereof I affix my signature.

ERNST BLANK.